United States Patent [19]

Scheffel

[11] Patent Number: 5,090,822
[45] Date of Patent: Feb. 25, 1992

[54] BEARING ARRANGEMENT FOR HIGH-SPEED SHAFTS

[75] Inventor: Rudolf Scheffel, Gondsroth, Fed. Rep. of Germany

[73] Assignee: Gesellschaft für Kernverfahrenstechnik m.b.H., Jülich, Fed. Rep. of Germany

[21] Appl. No.: 754,528

[22] Filed: Jul. 31, 1968

[51] Int. Cl.$^5$ .............................................. F16C 25/00
[52] U.S. Cl. ..................................... 384/193; 384/99; 384/196; 384/198; 384/215; 384/245
[58] Field of Search ................ 308/143, 147, 149–156, 308/168–172; 233/1 GD; 384/99, 193, 196, 198, 215, 220, 223, 245

[56] References Cited

U.S. PATENT DOCUMENTS

| | | | |
|---|---|---|---|
| 501,408 | 7/1893 | Draper | 308/169 |
| 2,034,670 | 3/1936 | Stahlecker | 308/169 |
| 3,035,878 | 5/1962 | Bell et al. | 308/143 |
| 3,113,809 | 12/1963 | Eggmann | 308/143 X |
| 3,216,655 | 11/1965 | Wind et al. | 233/1 GD |

FOREIGN PATENT DOCUMENTS 1298947  6/1962  France ................................. 308/169

*Primary Examiner*—Harold J. Tudor
*Attorney, Agent, or Firm*—Spencer & Frank

[57] ABSTRACT

An improved bearing arrangement for a high-speed, preferably vertical, shaft having a bearing body which takes up both the axial and the radial bearing forces. The bearing body is clamped or mounted in a fixed support solely by means of at least one elastic membrane-type element, e.g. a disc-shaped membrane, which extends in the radial direction so as to provide for the elastic return of the bearing body and the shaft to an initial reference position in both radial and axial directions.

8 Claims, 1 Drawing Sheet

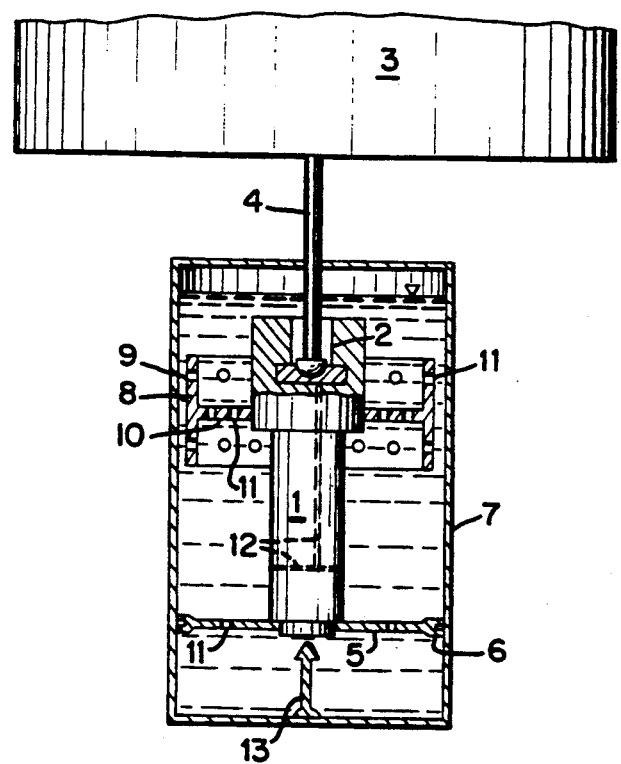

BEARING ARRANGEMENT FOR HIGH-SPEED SHAFTS

The invention relates to a bearing arrangement for high-speed shafts in a bearing body taking up the axial and radial bearing forces, respectively.

High-speed shafts of the kind required, e.g., for the rotors of gas centrifuges, must be supported in bearings very carefully. Thus, for instance, in a familiar design elastically centered dampers are installed to absorb oscillations.

This invention has the purpose of creating a bearing arrangement for high-speed shafts in which springing as well as damping can be realized by means of relatively simple designs.

In the invention this problem is solved in that the bearing body is clamped to a firm support by means of at least one elastic, membrane-type element extending in the radial direction. For the elastic return of the bearing body—and hence also of the shaft supported by it—to the central initial position, e.g., a disk shaped membrane is arranged in circular symmetry to the longitudinal axis of the bearing body and clamped in the support with its outer rim. Instead of a disk-shaped membrane it is possible also to use, e.g., crosswise stretched bands or a spoked rim to accomodate the bearing body in the region of the crossings. For intensive shock absorption the bearing body may have a pot-like top provided with throttling aperatures which is located in an oil bath of the proper viscosity. It is advantageous to have this oil extend up to the bearing position of the shaft where it lubricates the bearing at the same time.

One example of the bearing according to the invention is explained in more detail on the basis of the drawing:

The FIG. shows a cylindrical bearing body 1 with a bore acting as the bearing area 2 to take up the shaft 4 carrying a rotor 3 with preferably spherical bearing faces. Attached to the bearing body 1 and at right angles to its longitudinal axis on the end away from the bearing area 2 there is a disk-shaped elastic membrane 5 the outer rim of which is clamped to the inner wall of a fixed container 7 through a holder 6. The container 7 is filled with oil beyond the bearing area 2. The bearing body 1 has an oil channel 12 which opens out into the bearing area 2, preferably eccentrically and allows an oil flow to pass.

Shortly below or at the level of the bearing area 2 the bearing body 1 carries a damping pot 8 surrounding it in a circular symmetrical way. This pot, which is completely immersed in oil, consists essentially of a ring-shaped rim 9 extending concentrically with the longitudinal axis of the bearing body 1, and a bottom of the pot 10. Rim as well as bottom can be provided with throttling apertures 11 shaped, e.g., as fine bores or slots. However, also the membrane 5 may have such apertures. Centrically below the bearing body 1, preferably connected to the container 7, a support 13 limiting the bending of the membrane 5 is installed.

The invention combines in one component, which at the same time can exercise damping functions, the elastic return of the bearing area and the shaft, respectively, to the central initial position in the axial and radial directions.

I claim:

1. Bearing arrangement for high-speed shafts comprising: a bearing body taking up the axial and the radial bearing forces, respectively, and supporting a free end of the shaft in a bearing area, said bearing body being clamped in a fixed support solely by means of at least one elastic, membrane-type element which extends in the radial direction so as to provide for the elastic return of the bearing body and the shaft to an initial reference position in both axial and radial directions, and the top of the bearing body is provided with a damping pot immersed in a fluid bath.

2. Bearing arrangement as claimed in claim 1, above, wherein said element is a disk-shaped membrane being arranged in circular symmetry with the axis of the shaft and the bearing body respectively, and clamped in the support with its outer rim.

3. Bearing arrangement as claimed in claim 1 above, wherein the damping pot surrounds the bearing body at about the level of the shaft bearing area in a circular symmetrical way, while the membrane-type element is attached to an end of the bearing body away from the bearing area.

4. Bearing arrangement as claimed in claim 1 above, wherein the damping pot has throttling apertures for the passage of the fluid.

5. Bearing arrangement as claimed in claim 3 above, wherein the bearing area and the free end of the shaft have spherical bearing faces associated with each other.

6. Bearing arrangement as claimed in claims 1 above, wherein a support is attached to a fluid bath container centrically below the bearing body to limit bending of the membrane-type element.

7. Bearing arrangement for high-speed shafts comprising: a bearing body taking up the axial and the radial bearing forces, respectively, said bearing body being clamped in a fixed support solely by means of at least one elastic, membrane-type element which extends in the radial direction so as to provide for the elastic return of the bearing body and the shaft to an initial reference position in both axial and radial directions; said bearing body and said membrane being surrounded by an oil bath which at the same time serves for lubrication, and the membrane-type element has throttling apertures for the passage of the oil.

8. Bearing arrangement for a high-speed vertical shaft comprising a bearing body taking up the axial and the radial bearing forces, respectively, said bearing body being clamped in a fixed support solely by means of at least one elastic, membrane-type element which extends in the radial direction so as to provide for the elastic return of the bearing body and the shaft to an initial reference position in both axial and radial directions, said bearing arrangement constituting the lower support for said vertical shaft.

* * * * *

UNITED STATES PATENT AND TRADEMARK OFFICE
CERTIFICATE OF CORRECTION

PATENT NO.   : 5,090,822

DATED        : February 25th, 1992

INVENTOR(S)  : Rudolf Scheffel

It is certified that error appears in the above-identified patent and that said Letters Patent is hereby corrected as shown below:

On the title page of the patent under [30] please insert:
            Foreign Application Priority Data
--July 31, 1967 [DE]  Fed. Rep. of Germany ....G 50 781 III/82 b--

Signed and Sealed this

Fourth Day of May, 1993

Attest:

MICHAEL K. KIRK

Attesting Officer

Acting Commissioner of Patents and Trademarks